(12) United States Patent
Mishra

(10) Patent No.: US 9,394,988 B2
(45) Date of Patent: Jul. 19, 2016

(54) RING SEAL

(71) Applicant: Electro-Motive Diesel, Inc., LaGrange, IL (US)

(72) Inventor: Saket A. Mishra, Burr Ridge, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/324,284

(22) Filed: Jul. 7, 2014

(65) Prior Publication Data

US 2016/0003343 A1    Jan. 7, 2016

(51) Int. Cl.
*F16J 15/02* (2006.01)
*F16H 57/029* (2012.01)

(52) U.S. Cl.
CPC .............. *F16H 57/029* (2013.01); *F16J 15/022* (2013.01)

(58) Field of Classification Search
CPC ..... F16J 15/104; F16J 15/0887; F16J 15/061; F16J 9/00
See application file for complete search history.

(56) References Cited

U.S. PATENT DOCUMENTS

| | | | |
|---|---|---|---|
| 3,776,559 A * | 12/1973 | Cawthorn | F16J 15/4474 277/419 |
| 4,025,079 A | 5/1977 | Renk et al. | |
| 4,470,324 A * | 9/1984 | Renk | F16H 57/0423 277/409 |
| 4,730,833 A | 3/1988 | Foster et al. | |
| 5,676,221 A * | 10/1997 | Renk | F16H 57/029 184/6.12 |

FOREIGN PATENT DOCUMENTS

EP    0025300    3/1984

* cited by examiner

*Primary Examiner* — Gilbert Lee

(57) ABSTRACT

A ring seal for a machine component is provided. The ring seal includes a main body. The main body includes an inner surface defining an inner periphery. The main body also includes an outer surface defining an outer periphery. The ring seal also includes a tab having a height and a width. The tab extends from the main body. The tab is configured to contact at least one of a first interfacing surface and a second interfacing surface of the machine component to provide sealing therebetween.

16 Claims, 4 Drawing Sheets

RING SEAL

TECHNICAL FIELD

The present disclosure relates to a ring seal, and more specifically to a ring seal for a machine component for providing sealing between interfacing surfaces thereof.

BACKGROUND

A machine component, such as, a gear case, may have one or more openings provided thereon for receiving one or more components, such as, a shaft, a bearing, etc., therethrough. A sealing member may be provided in these openings to provide improved sealing and/or to reduce leakage of fluids, for example, lubricant contained within the gear case.

However, the sealing member may tend to fail due to varied reasons, such as, inadequate sealing area provided by the sealing member, inappropriate design of the sealing member, and so on. Further, in some situations, the sealing member may be provided between two or more interfacing surfaces fastened together by fastening members. Presence of the sealing member between the interfacing surfaces may develop excess stress and/or strain in the fastening members.

U.S. Pat. No. 5,676,221 describes a gear case assembly and lubricant retaining device. The gear case assembly includes a gear case having a hub and/or shaft receiving opening therein. The lubricant retaining device extends toward the interior of the gear case to reduce lubricant flow through the opening. A part of the lubricant retaining device acts as a diverter to restrict lubricant flow toward the opening and consequential potential losses therethrough.

SUMMARY OF THE DISCLOSURE

In one aspect of the present disclosure, a ring seal for a machine component is provided. The ring seal includes a main body. The main body includes an inner surface defining an inner periphery. The main body also includes an outer surface defining an outer periphery. The ring seal also includes a tab having a height and a width. The tab extends from the main body. The tab is configured to contact at least one of a first interfacing surface and a second interfacing surface of the machine component to provide sealing therebetween.

In another aspect of the present disclosure, a gear case for a gear and shaft assembly is provided. The gear case includes a first component having a first interfacing surface. The gear case also includes a second component having a second interfacing surface. The gear case further includes a ring seal provided between the first interfacing surface and the second interfacing surface. The ring seal includes a main body. The main body includes an inner surface defining an inner periphery. The main body also includes an outer surface defining an outer periphery. The ring seal also includes a tab having a height and a width. The tab extends from the main body. The tab is configured to contact at least one of the first interfacing surface and the second interfacing surface of the gear case to provide sealing therebetween.

Other features and aspects of this disclosure will be apparent from the following description and the accompanying drawings.

DETAILED DESCRIPTION

Figure 1:
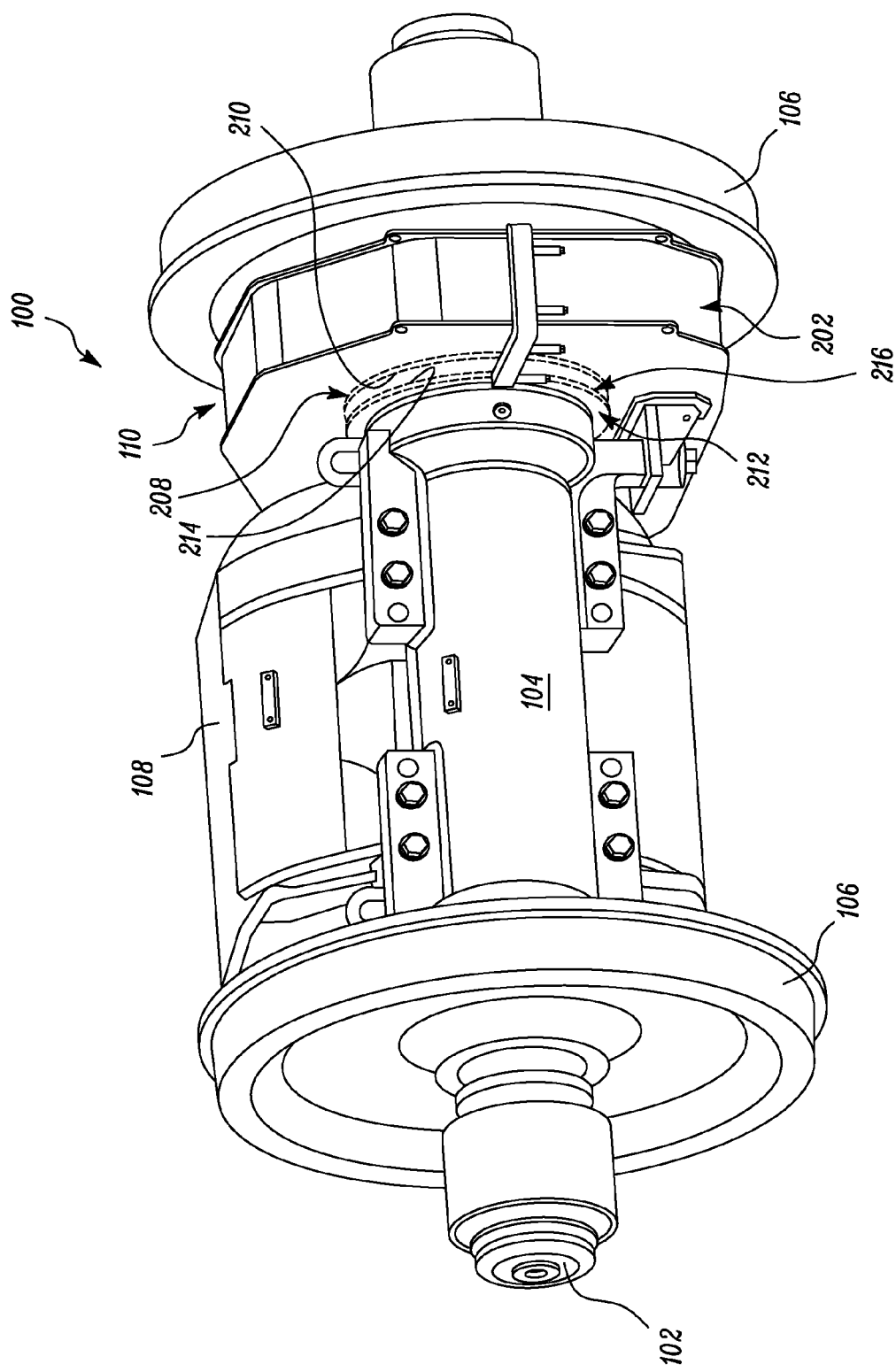
FIG. 1 is a perspective view of an exemplary wheel set, according to an embodiment of the present disclosure.

Wherever possible, the same reference numbers will be used throughout the drawings to refer to the same or the like parts. Referring to FIG. 1, a perspective view of an exemplary wheel set assembly 100, hereinafter referred to as the wheel set 100, for a locomotive (not shown) is illustrated. The wheel set 100 may be coupled to a frame of the locomotive. The wheel set 100 is configured to provide mobility to the locomotive on a set of rails (not shown). The wheel set 100 may include an axle 102. The axle 102 is enclosed within an axle housing 104. The wheel set 100 may also include a pair of wheels 106. Each of the pair of the wheels 106 is fixedly provided on opposing ends of the axle 102. The pair of the wheels 106 is configured to provide support and mobility to the locomotive on the set of the rails.

The wheel set 100 may include a traction motor 108. The traction motor 108 is removably mounted on the axle housing 104. The traction motor 108 may be any electric motor powered by an alternating current (AC) source and/or a direct current (DC) source. The traction motor 108 is configured to provide motive power to the axle 102 and/or the pair of the wheels 106 and will be explained later.

Further, the wheel set 100 may include a gear and shaft assembly (not shown). The gear and shaft assembly may include a pinion gear coupled to a shaft (not shown) of the traction motor 108. The pinion gear is further provided in mesh with a bull gear of the gear and shaft assembly. It should be noted that the gear and shaft assembly may include one or more intermediate gears provided in mesh with the pinion gear, the bull gear and/or with one another. The intermediate gears may be provided based on a required drive ratio between the pinion gear and the bull gear. The bull gear is fixedly coupled to the axle 102 and/or any one of the pair of the wheels 106. Accordingly, the gear and shaft assembly is configured to transfer motive power from the traction motor 108 to the axle 102 and the pair of the wheels 106.

Figure 2:
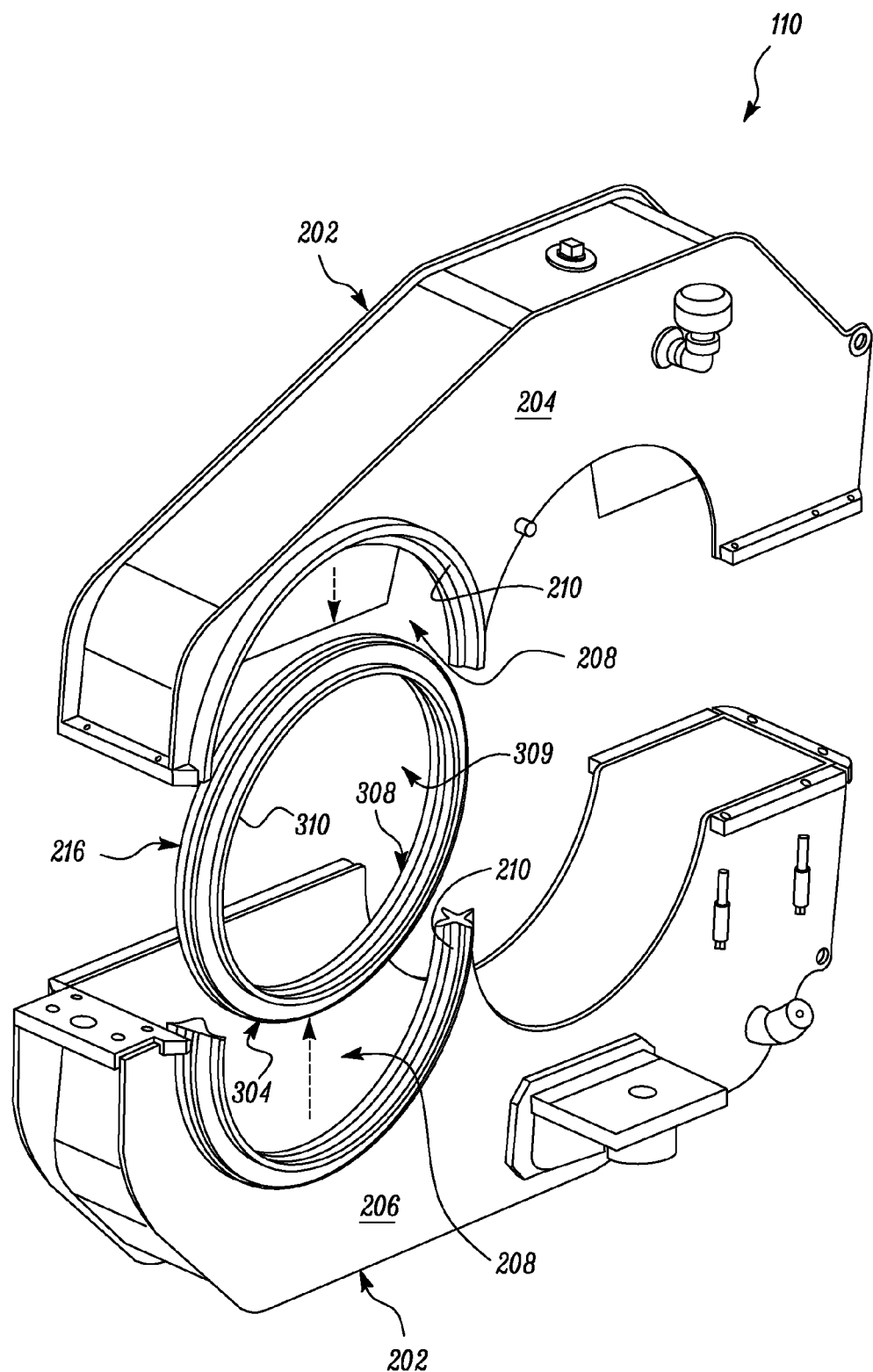
FIG. 2 is an exploded view of a gear case, according to an embodiment of the present disclosure.

Additionally, the wheel set 100 may include a gear case 110. The gear case 110 is configured to enclose the gear and shaft assembly therein. The gear case 110 may store lubricating oil therein. The lubricating oil may provide lubrication and/or allow for heat exchange within the gear and shaft assembly. The gear case 110 may include a first component 202, such as, an enclosure. Referring to FIG. 2, an exploded view of the gear case 110 is illustrated. The first component 202 may includes a first casing 204 and a second casing 206. When assembled, the first and second casings 204, 206 may be affixed to one another, thereby, enclosing the gear and shaft assembly therein. The first and second casings 204, 206 may be affixed to one another by any known fastening methods, such as, bolting, riveting, and so on.

Figure 3:
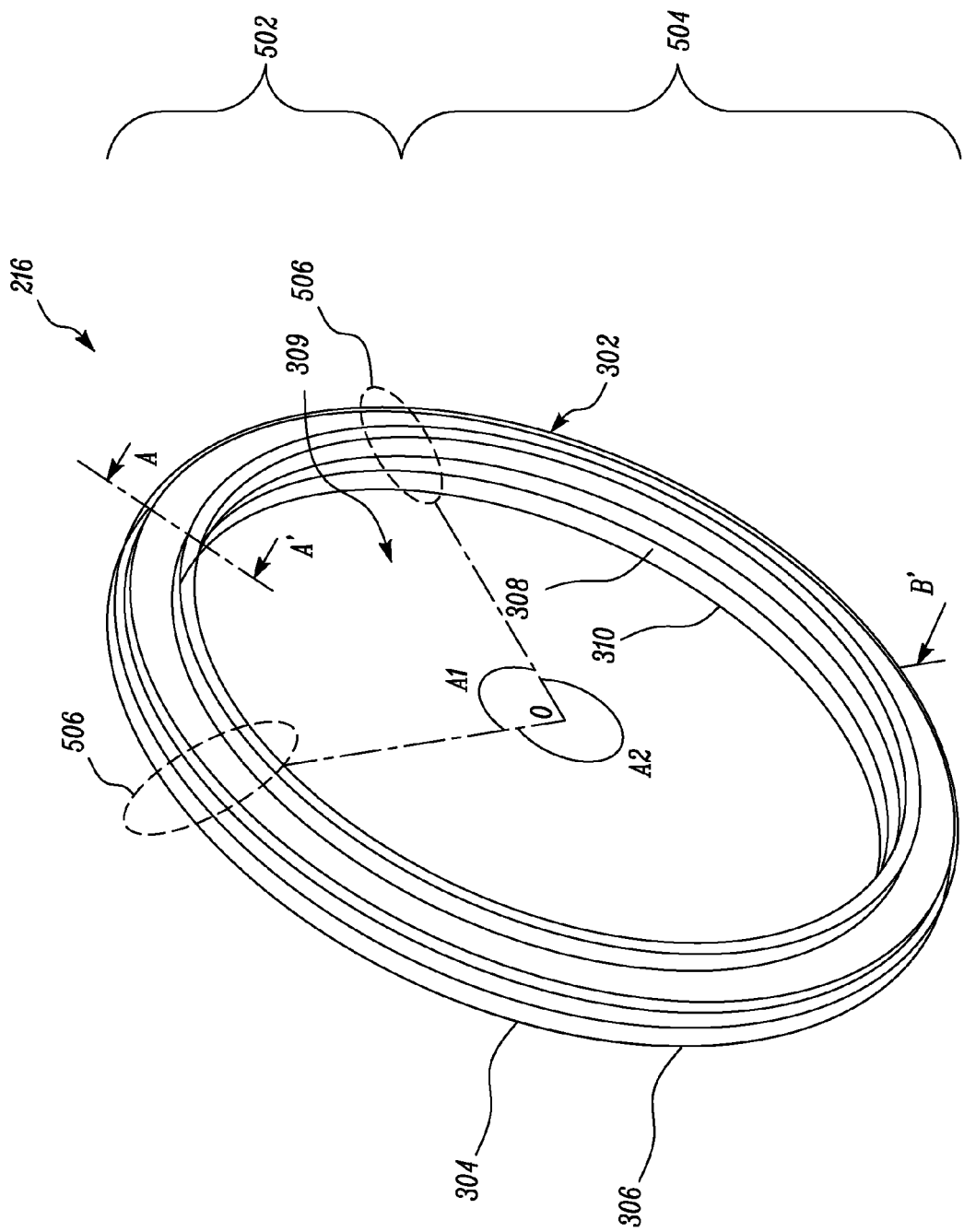
FIG. 3 is a perspective view of a ring seal, according to an embodiment of the present disclosure having axis A-A'.

Further, once assembled, the first and second casings 204, 206 collectively define an opening 208 therethrough. As shown in FIGS. 1 and 2, the opening 208 defines a first interfacing surface 210. In one embodiment, the opening 208 is configured to receive a shaft (not shown) of the pinion gear therethrough. In other embodiments, the opening 208 may receive a shaft (not shown) of the bull gear, a shaft (not shown) of the traction motor 108 or the axle 102, and so on. Additionally, the gear case 110 includes a second component 212 defining a second interfacing surface 214. The second component 212 may include a bearing, a retention ring, and so on. In one embodiment, the second component 212 is configured to rotatably support the shaft of the pinion gear in the opening 208. Further, during assembly, a ring seal 216 is provided between the first component 202 and the second component 212. Referring to FIG. 3, a perspective view of the ring seal 216 is illustrated. The ring seal 216 may include a main body 302. The main body 302 has a circular ring like configuration. The main body 302 has an outer surface 304 defining an outer periphery 306. Also, the main body 302 has an inner surface 308 defining an inner periphery 310. The ring seal 216 will be described in more detail with reference to FIG. 4. As shown in FIGS. 1 and 2, the ring seal 216 is positioned in system in such a manner that the outer surface 304 may contact with the first interfacing surface 210 and the inner surface 308 of the ring seal may contact with the second interfacing surface 214. The second component 212 is received into an opening 309 defined by the inner periphery 310 of the ring seal 216 and is not shown in FIG. 2 for the purpose of clarity.

Figure 4:
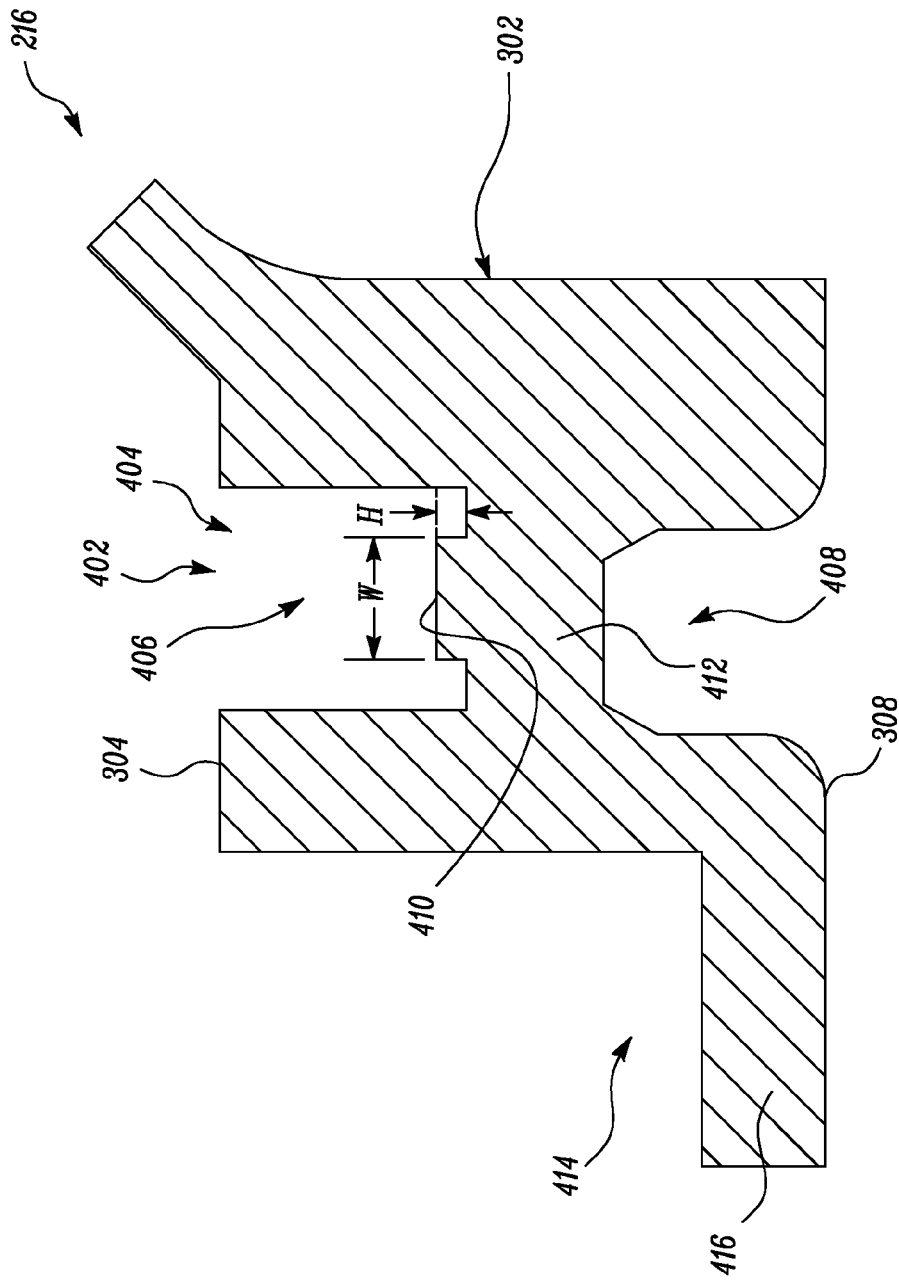
FIG. 4 is a cross sectional view of the ring seal along the axis A-A', according to an embodiment of the present disclosure.

Referring to FIG. 4, a cross sectional view of the ring seal 216 along an axis A-A' (shown in FIG. 3) is illustrated. The main body 302 of the ring seal 216 may include a first section 402 having an H-shaped cross section 404. When assembled, the first section 402 is configured to receive the first interfacing surface 210 and the second interfacing surface 214 on either side thereof. Accordingly, the main body 302 may include a first depression 406 provided circumferentially on the outer surface 304. The first depression 406 is configured to receive the first interfacing surface 210. In other embodiments, the first depression 406 may be configured to receive the second interfacing surface 214. Additionally or optionally, the main body 302 may include a second depression 408 provided circumferentially on the inner surface 308. The second depression 408 is configured to receive the second interfacing surface 214. In other embodiments, the second depression 408 may be configured to receive the first interfacing surface 210. Further, a tab 410 is provided extending from the main body 302 of the ring seal 216. The tab 410 is configured to contact with the first and/or second interfacing surfaces 210, 214 when assembled.

As shown in FIG. 4, the ring seal 216 may have the H-shaped cross section 404. The tab 410 is provided on a central member 412 of the H-shaped cross section 404. The tab 410 defines a height "H" and a width "W". The height "H" and the width "W" of the tab 410 is based on a linear relationship. In one embodiment, the linear relationship is defined by a ratio 1:4. In other embodiments, the ratio may be 1:12. The tab 410 may be provided along the outer surface 304. Accordingly, the tab 410 is configured to contact the first interfacing surface 210 and provide sealing therebetween. In other embodiments, the tab 410 may be provided along the inner surface 308. Accordingly, the tab 410 is configured to contact the second interfacing surface 214 and provide sealing therebetween. In yet other embodiments, the tab 410 may be provided on both the inner and outer surfaces 308, 304. Accordingly, the tab 410 is configured to contact both the first and second interfacing surfaces 210, 214 respectively and provide sealing therebetween.

The height "H" of the tab 410 provided on the outer surface 304 varies along the outer periphery 306. The tab 410 defines a first height in an upper section 502 of the ring seal 216. At least a portion of the upper section 502 is configured to contact the first casing 204 of the gear case 110. Additionally, the tab 410 defines a second height in a lower section 504 of the ring seal 216. At least a portion of the lower section 504 is configured to contact the second casing 206 of the gear case 110.

Referring to FIG. 3, the first height of the tab 410 in the upper section 502 of the ring seal 216 may be lesser than the second height of the tab 410 in the lower section 504 of the ring seal 216. The height "H" of the tab 410 may be equal to the first height in the upper section 502 along an angle "A1" subtended by the outer periphery 306 at a center "O" of the ring seal 216. In one embodiment, the angle "A1" may be approximately equal to 120 degrees. Further, the height "H" of the tab 410 may be equal to the second height in the lower section 504 along an angle "A2" subtended by the outer periphery 306 at the center "O" of the ring seal 216. In one embodiment, the angle "A2" may be approximately equal to 240 degrees. It should be noted that the first and second heights of the tab 410 may vary along the outer periphery 306 and any portion of the ring seal 216 based on a design and configuration of the system.

The first and/or second heights of the tab 410 may provide an optimum sealing force between the first and second casings 204, 206 of the first component 202 and the second component 212 of the gear case 110 after assembly thereof. It should be noted that the height "H" of the tab 410 may include different heights "H" along the outer periphery 306 in addition to the first and second heights without any limitation to the scope of the disclosure. Further, in the embodiment when the tab 410 may be provided on the inner surface 308, the height "H" of the tab 410 may vary along the inner periphery 310 in a similar manner as described with reference to the outer periphery 306.

Additionally, the tab 410 includes a transition portion 506 provided at an area where the height "H" of the tab 410 changes from the first height to the second height and vice versa. The transition portion 506 having a tapering height between the first height and the second height is configured to provide a gradual change in the height "H" of the tab 410 from the first height to the second height and vice versa. Various methods known in the art may be used to determine the tapering height of the ring seal 216. In one embodiment, the tapering height may be determined by use of a surface that is tangential to an arc of at least one of the first height and the second height. In another embodiment, a part of or a complete ellipse may be used for defining the tab 410 such that the height "H" of the tab 410 may change along the ring seal 216. The gradual change in the height "H" of the tab 410 is configured to prevent a sharp change in a sealing area or inconsistency in the sealing area.

As shown, the main body 302 may include a second section 414 having a lip portion 416. The lip portion 416 may extend away and substantially perpendicular to the H-shaped cross section 404. The lip portion 416 may extend along the inner and/or outer periphery 310, 306 of the main body 302. The lip portion 416 is configured to receive a fastening element (not shown) thereon, such as, a retention ring, a circlip, a clamp ring, and so on. The ring seal 216 may be made of any elastomeric material, such as, rubber, and so on. In other embodiments, the ring seal 216 may also be made of any metal or an alloy.

INDUSTRIAL APPLICABILITY

The present disclosure relates to the ring seal 216 having the tab 410 extending from the main body 302. The tab 410 provides increased sealing area configured to receive a sealing force during fastening of the first and second casings 204, 206. Additionally, the change in the height "H" of the tab 410 provides for increased sealing area in critical locations along the first and second interfacing surfaces 210, 214. Also, the change in the height "H" of the tab 410 may reduce the development of stress and/or strain in the fastening member by decreasing an effective area of the ring seal 216 provided between the first and second interfacing surfaces 210, 214. This stress and/or strain may otherwise be developed in the fastening member during and/or after fastening of the first and second casings 204, 206 with each other.

For example, a higher volume of the lubricating oil may be present in the second casing 206 of the gear case 110. As such, the second casing 206 may be provided as an oil sump for the gear case 110. As a result, a larger sealing area may be required along the second interfacing surface 214 due to presence of a higher volume of the lubricating oil therein. Accordingly, the height "H" of the tab 410 of the ring seal 216 may be greater in the lower section 504 with respect to the upper section 502 of the ring seal 216 in order to provide a relatively larger sealing area. Further, the sealing area along the first interfacing surface 210 may be reduced as a lower volume of the lubricating oil may be present therein. Accordingly, the height "H" of the tab 410 may be lesser in the upper section 502 with respect to the lower section 504 of the ring seal 216 in order to provide relatively lower sealing area. The variation in the height "H" of the tab 410 may allow for different sealing areas along the first and second interfacing surfaces 210, 214 based on a sealing requirement thereof. Also, the transition portion 506 may provide the gradual change in the height "H" of the tab 410 in order to allow the gradual change in the height "H" of the tab 410 from the first height to the second height "and reduce inconsistency in the sealing area.

A person of ordinary skill in the art will appreciate that the present disclosure describes an exemplary application of the ring seal 216. The ring seal 216 may be utilized in a variety of applications and environments not described herein without deviating from the scope of the present disclosure. Also, the design and configuration of the ring seal 216 may be modified based on the system requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A ring seal for a machine component, the ring seal comprising:
   a main body comprising:
      an inner surface defining an inner periphery; and
      an outer surface defining an outer periphery; and
      a first depression provided on the outer surface, the first depression configured to receive any one of a first interfacing surface or a second interfacing surface of the machine component;
      a second depression provided on the inner surface, the second depression configured to receive the other of the any one of the first interfacing surface or the second interfacing surface of the machine component; and
      a tab within at least one of the first depression or the second depression and having a height and a width, wherein the tab is configured to contact at least one of a first interfacing surface and a second interfacing surface of the machine component to provide sealing therebetween.

2. The ring seal of claim 1, wherein the height of the tab varies along at least one of the inner periphery and the outer periphery.

3. The ring seal of claim 1, wherein a linear relationship between the width and the height of the tab is defined by a ratio of 1:4.

4. The ring seal of claim 1, wherein a linear relationship between the width and the height of the tab is defined by a ratio of 1:12.

5. The ring seal of claim 1, wherein the main body includes a first section having an H-shaped cross section, the first section configured to receive the first interfacing surface and the second interfacing surface on either side thereof.

6. The ring seal of claim 5, wherein the tab is provided on a central member of the H- shaped cross section.

7. The ring seal of claim 5, wherein the main body further includes a second section having a lip portion extending from the H-shaped cross section, the lip portion configured to receive a fastening member thereon.

8. The ring seal of claim 1, wherein the tab is provided along at least one of the inner surface and the outer surface.

9. The ring seal of claim 1, wherein the ring seal is made of an elastomeric material.

10. A gear case for a gear and shaft assembly, the gear case comprising:
    a first component having a first interfacing surface;
    a second component having a second interfacing surface; and
    a ring seal provided between the first interfacing surface and the second interfacing surface, the ring seal comprising:
      a main body comprising:
        an inner surface defining an inner periphery; and
        an outer surface defining an outer periphery; and
        a first depression provided on the outer surface, the first depression configured to receive any one of the first interfacing surface or the second interfacing surface of the gear case;
        a second depression provided on the inner surface, the second depression configured to receive the other of the any one of the first interfacing surface or the second interfacing surface of the gear case; and
        a tab within at least one of the first depression or the second depression and having a height and a width, wherein the tab is configured to contact at least one of a first interfacing surface and a second interfacing surface of the gear case to provide sealing therebetween.

11. The gear case of claim 10, wherein the height of the tab varies along at least one of the inner periphery and the outer periphery.

12. The gear case of claim 10, wherein a linear relationship between the width and the height of the tab is defined by a ratio of 1:4.

13. The gear case of claim 10, wherein a linear relationship between the width and the height of the tab is defined by a ratio of 1:12.

14. The gear case of claim 10, wherein the main body includes a first section having an H-shaped cross section, the first section configured to receive the first interfacing surface and the second interfacing surface on either side thereof.

15. The gear case of claim 14, wherein the tab is provided on a central member of the H- shaped cross section.

16. The gear case of claim 14, wherein the main body further includes a second section having a lip portion extending from the H-shaped cross section, the lip portion configured to receive a fastening member thereon.

* * * * *